United States Patent
Kaler et al.

(10) Patent No.: US 9,191,375 B2
(45) Date of Patent: Nov. 17, 2015

(54) SYSTEM AND METHOD FOR ACCESSING INTEGRATED APPLICATIONS IN A SINGLE SIGN-ON ENABLED ENTERPRISE SOLUTION

(75) Inventors: Jasdeep Singh Kaler, Bangalore (IN); Preethi Thoppil, Bangalore (IN); Sujit Kumar Mahapatra, Bhubaneswar (IN)

(73) Assignee: Infosys Limited, Bangalore (IN)

(*) Notice: Subject to any disclaimer, the term of this patent is extended or adjusted under 35 U.S.C. 154(b) by 55 days.

(21) Appl. No.: 13/979,614

(22) PCT Filed: Jan. 13, 2011

(86) PCT No.: PCT/IN2011/000023
§ 371 (c)(1),
(2), (4) Date: Jul. 12, 2013

(87) PCT Pub. No.: WO2012/095854
PCT Pub. Date: Jul. 19, 2012

(65) Prior Publication Data
US 2013/0290719 A1    Oct. 31, 2013

(51) Int. Cl.
*H04L 29/06*    (2006.01)
*G06F 21/41*    (2013.01)

(52) U.S. Cl.
CPC ............ *H04L 63/0435* (2013.01); *G06F 21/41* (2013.01)

(58) Field of Classification Search
CPC ............ H04L 63/0435; H04L 63/0807; H04L 63/0815; G06F 21/41
USPC ........................................................ 713/168
See application file for complete search history.

(56) References Cited

U.S. PATENT DOCUMENTS

| 5,602,917 | A | * | 2/1997 | Mueller ..................... 380/284 |
| 6,081,508 | A | * | 6/2000 | West et al. .................. 370/238 |
| 6,243,816 | B1 | | 6/2001 | Fang et al. |
| 6,826,696 | B1 | | 11/2004 | Chawla et al. |
| 7,353,383 | B2 | | 4/2008 | Skingle |
| 7,636,852 | B1 | | 12/2009 | Balasubramanian et al. |

(Continued)

FOREIGN PATENT DOCUMENTS

WO    WO 01/11452 A2    2/2001

OTHER PUBLICATIONS

Chou, Wesley. "Inside SSL: the secure sockets layer protocol." IT professional 4.4 (2002): 47-52.*

(Continued)

*Primary Examiner* — Syed Zaidi
(74) *Attorney, Agent, or Firm* — Klarquist Sparkman, LLP (57) ABSTRACT

A method for performing access management to facilitate a user to access applications in a single sign-on enabled enterprise solution is provided. A challenge token and a response token are transmitted between a server and a client. The challenge token and response token comprises one-way hashed data. The response token is verified at the server and the client to authenticate the user. Further, a request for service token is transmitted between the server and the client. The request for service token is encrypted at the client and decrypted at the server using a unique session key negotiated between the server and client. A service token is generated and transmitted between the server and the client. The service token is encrypted and decrypted at the server using a secret key to verify the service token. Based on the verification, the requested applications are rendered on client based user interface.

17 Claims, 2 Drawing Sheets

(56) References Cited

U.S. PATENT DOCUMENTS

| | | | |
|---|---|---|---|
| 2001/0047477 A1* | 11/2001 | Chiang | 713/170 |
| 2002/0144119 A1 | 10/2002 | Benantar | |
| 2002/0150253 A1* | 10/2002 | Brezak et al. | 380/281 |
| 2003/0093680 A1 | 5/2003 | Astley et al. | |
| 2003/0182551 A1* | 9/2003 | Frantz et al. | 713/170 |
| 2006/0070114 A1 | 3/2006 | Wood et al. | |
| 2006/0265740 A1* | 11/2006 | Clark et al. | 726/8 |
| 2007/0006291 A1 | 1/2007 | Barari et al. | |
| 2007/0294752 A1 | 12/2007 | Kinser et al. | |
| 2009/0132828 A1 | 5/2009 | Kiester et al. | |
| 2009/0271847 A1 | 10/2009 | Karjala et al. | |
| 2010/0306547 A1 | 12/2010 | Fallows et al. | |

OTHER PUBLICATIONS

International Search Report for PCT/IN2011/000023, dated Jul. 13, 2011, 6 pages.

* cited by examiner

SYSTEM AND METHOD FOR ACCESSING INTEGRATED APPLICATIONS IN A SINGLE SIGN-ON ENABLED ENTERPRISE SOLUTION

CROSS REFERENCE TO RELATED APPLICATIONS

This is the U.S. National Stage of International Application No. PCT/IN2011/000023, filed Jan. 13, 2011, which was published in English under PCT Article 21(2).

FIELD OF THE INVENTION

The present invention relates generally to the field of access control in distributed computer applications and more particularly to a system and method that facilitates access management of integrated applications in a single sign-on enabled enterprise solution.

BACKGROUND OF THE INVENTION

With the advent of technology, a user accesses multiple applications to avail different kinds of services provided by various vendors. To access such applications the user has to login using different login sessions. The login sessions include different user interfaces with different user credentials such as usernames and passwords for identification and authentication of the user to access various applications. The user is therefore required to enter separate user credentials for logging into each application. This causes difficulty to users as the user has to remember and maintain different login details.

Conventionally, single sign-on tool exists that enables authorized users to perform single initial sign-on to access a variety of applications across multiple nodes. For example, the single sign-on tool may include a web-based single sign-on tool. The user logs in once and gains access to multiple web applications without being prompted to log in again to access each application. However, a user accesses multiple applications using different web-based user interfaces via uniform resource locators (URLs) which are associated with each application. A single sign-on solution that provides a unified view of multiple integrated applications and facilitates the user to access multiple applications using same user interface does not exist. Further, there is no provision for one application to access a common context in another application in a seamless manner using same user interface.

In light of the above, there is a need for a system and method which facilitates a unified view of multiple applications integrated in single sign-on enterprise solutions. Also, there is a need for a system and method that facilitates managing access to multiple applications using a unified user interface during user's logged in session, without requiring to access the different applications via different interfaces. Further, there is a need for a system and method which facilitates using common features across multiple applications without the need for modifying client device settings. Also, there is a need for a system and method that provides a secured single point of authentication and authorization for accessing multiple applications.

SUMMARY OF THE INVENTION

A method for performing access management to facilitate a user to access one or more applications in a single sign-on enabled enterprise solution is provided. In various embodiments of the present invention, the method comprises performing data transaction between a server and a client for authenticating the user. The data transaction comprises, firstly, transmitting a challenge token and a response token between the server and the client. The challenge token and the response token comprises one-way hashed data. The data transaction further comprises verifying the response token at the server and at the client using the one-way hashed data. The method further comprises performing data transaction between the server and the client for authorizing the user to access one or more applications. The data transaction comprises transmitting a request for service token between the server and the client. The request for service token is encrypted at the client and decrypted at the server using a unique session key negotiated between the server and client. The data transaction further comprises transmitting a service token between the server and the client. The service token is encrypted and decrypted at the server using a secret key to verify the service token. Finally, the data transaction comprises rendering the requested one or more applications on a user interface of the client based on the verification.

In an embodiment of the present invention, performing data transaction between a server and a client for authenticating the user comprises, firstly, receiving, at a client, a first challenge token from a server, wherein the first challenge token comprises a one-way hashed random number. Secondly, the method comprises receiving, at a server, a first response token from the client. The first response token comprises a one-way hash of first challenge token and a one-way hashed password of the user. The method further comprises verifying, at the server, the first response token based on comparing the first response token with hash of the hashed first challenge token and a one-way hashed password. Furthermore, the method comprises receiving, at the server, a second challenge token. The second challenge token comprises a one-way hashed random number. The method also comprises receiving, at the client, a second response token. The second response token comprises a one-way hashed second challenge token and a one-way hashed password of the user. The method further comprises verifying, at the client, the second response token based on comparing the second response token with hash of the hashed second challenge token and a one-way hashed password. Finally, the method comprises authenticating the user based on the verification.

In another embodiment of the present invention, the method further comprises, firstly, generating, at the server, a unique session identification associated with the user. The unique session identification is a random number. Secondly, the method comprises storing the unique session identification in a database. In yet another embodiment of the present invention, the method further comprises, firstly, creating, at the server, the unique session key after authenticating the user. The unique session key comprises at least one of: a user identification, a session identification and a timestamp. Secondly, the method comprises encrypting the unique session key using the one-way hashed password. Further, the method comprises receiving, at the client, the encrypted unique session key. Furthermore, the method comprises decrypting the unique session key using the one-way hashed password and storing the decrypted unique session key in a memory associated with the client.

In an embodiment of the present invention, performing data transaction between the server and the client for authorizing the user to access the application comprises, firstly, generating and encrypting, at the client, the request for service token. The request for service token is encrypted using the unique session key. Further the request for service token represents request, for accessing one or more applications. Secondly, the method comprises receiving and decrypting, at the server, the encrypted request for service token. The, encrypted request for service token is decrypted using the unique session key. Furthermore, the method comprises generating and encrypting, at the server, a service token corresponding to the request for service token. The service token is encrypted using the secret key. Further, the service token comprises data for accessing the application. The method further comprises receiving, at the client, the encrypted service token. Further, the method comprises receiving, at an application server from the client, the encrypted service token. The application server corresponds to the requested application. Furthermore, the method comprises receiving, at the server, the encrypted service token from the application server and decrypting, at the server, the encrypted service token to verify the service token. The encrypted service token is decrypted using the secret key. Finally, the method comprises rendering the requested one or more applications on a web-based user interface of the client based on the verification.

In an embodiment of the present invention, the request for service token comprises at least one of: internet protocol address associated with a client and application name associated with the requested one or more applications. In another embodiment of the present invention, the service token comprises at least one of: an internet protocol address associated with the client, a user identification, a session identification and a unique name associated with the requested one or more applications.

A system for performing access management to facilitate a user to access one or more applications in a single sign-on (SSO) enabled enterprise solution is provided. In various embodiments of the present invention, the system comprises an authentication and authorization module configured to enable the user to access one or more applications via a unified web-based user interface during a user's login session. The authentication is challenge-response based user authentication and authorization is token-based authorization. The system further comprises a, feature switching module configured to facilitate the user to switch between one or more features provided in the web-based user interface during the user's login session. Furthermore, the system comprises a context switching module configured to facilitate one application to access one or more data pertaining to another application during the user's login session by invoking a script language instruction via the web-based user interface.

In an embodiment of the present invention, the authentication and authorization module comprises a SSO server module associated with a SSO server and a SSO client module associated with one or more client applications. The SSO server module is configured to initiate and complete challenge-response based user authentication and token-based authorization with the SSO client module to enable the user to access one or more integrated applications present in the single sign-on (SSO) enabled enterprise solution.

A computer program product for performing access management to facilitate a user to access one or more applications in a single sign-on enabled enterprise solution is provided. In various embodiments of the present invention, the computer program product comprises program instruction code for performing data transaction between a server and a client for authenticating the user. The data transaction comprises transmitting a challenge token and a response token between the server and the client. The challenge token and the response token comprise one-way hashed data. The data transaction further comprises verifying the response token at the server and at the client using the one-way hashed data. The computer program product further comprises program instruction code for performing data transaction between the server and the client for authorizing the user to access one or more applications. The data transaction comprises transmitting a request for service token between the server and the client. The request for service token is encrypted at the client and decrypted at the server using a unique session key negotiated between the server and client. The data transaction further comprises transmitting a service token between the server and the client. The service token is encrypted and decrypted at the server using a secret key to verify the service token. Finally, the data transaction comprises rendering the requested one or more applications on a user interface of the client based on the verification.

In an embodiment of the present invention, the computer program product for performing data transaction between a server and a client for authenticating the user comprises program instruction code for receiving, at a client, a first challenge token from a server. The first challenge token comprises a one-way hashed random number. The computer program product further comprises program instruction code for receiving, at a server, a first response token from the client. The first response token comprises a one-way hash of first challenge token and a one-way hashed password of the user. The computer program product comprises program instruction code for verifying, at the server, the first response token based on comparing the first response token with hash of the hashed first challenge token and a one-way hashed password. Further, the computer program product comprises program instruction code for receiving, at the server, a second challenge token. The second challenge token comprises a one-way hashed random number. Furthermore, the computer program product comprises program instruction code for receiving, at the client, a second response token. The second response token comprises a one-way hashed second challenge token and a one-way hashed password of the user. The computer program product comprises program instruction code for verifying, at the client, the second response token based on comparing the second response token with hash of the hashed second challenge token and a one-way hashed password and program instruction code for authenticating the user based on the verification.

In another embodiment of the present invention, the computer program product further comprises program instruction code for generating, at the server, a unique session identification associated with the user. The unique session identification is a random number. Further, the computer program product comprises program instruction code for storing the unique session identification in a database.

In yet another embodiment of the present invention, the computer program product further comprises program instruction code for creating, at the server, the unique session key after authenticating the user. The unique session key comprises at least one of: user identification, session identification and a timestamp. Further, the computer program product comprises program instruction code for encrypting the unique session key using the one-way hashed password. The computer program product further comprises program instruction code for receiving, at the client, the encrypted unique session key and program instruction code for decrypting the unique session key using the one-way hashed password. Finally, the computer program product comprises program instruction code for storing the decrypted unique session key in a memory associated with the client.

In another embodiment of the present invention, the computer program product for performing data transaction between the server and the client for authorizing the user to access the application comprises program instruction code for generating and encrypting, at the client, the request for service token. The request for service token is encrypted using the unique session key. Further, the request for service token represents request for accessing one or more applications. The computer program product further comprises program instruction code for receiving and decrypting, at the server, the encrypted request for service token. The encrypted request for service token is decrypted using the unique session key. Furthermore, the computer program product comprises program instruction code for generating and encrypting, at the server, a service token corresponding to the request for service token. The service token is encrypted using the secret key. Further, the service token comprises data for accessing the application. The computer program product further comprises program instruction code for receiving, at the client, the encrypted service token. Furthermore, the computer program product comprises program instruction code for receiving, at an application server from the client, the encrypted service token. The application server corresponds to the requested application. The computer program product further comprises program instruction code for receiving, at the server, the encrypted service token from the application server. The computer program product further comprises program instruction code for decrypting, at the server, the encrypted service token to verify the service token. The encrypted service token is decrypted using the secret key. Further, the computer program code comprises program instruction code for rendering the requested one or more applications on a web-based user interface of the client based on the verification.

In another embodiment of the present invention, the request for service token comprises at least one of: internet protocol address associated with a client and application name associated with the requested one or more applications. In yet another embodiment of the present invention, the service token comprises at least one of: internet protocol address associated with the client, user identification, session identification and a unique name associated with the requested one or more applications.

BRIEF DESCRIPTION OF THE
ACCOMPANYING DRAWINGS

The present invention is described by way of embodiments illustrated in the accompanying drawings wherein.

DETAILED DESCRIPTION OF THE INVENTION

A system and method for facilitating access management of multiple applications in a single sign-on enabled enterprise solution is provided. The invention facilitates providing a unified view of applications. The invention further facilitates accessing multiple applications using unified user interface and allows switching between multiple applications in a single user session. Furthermore, the invention provides challenge-response and token based authentication and authorization for accessing multiple applications.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
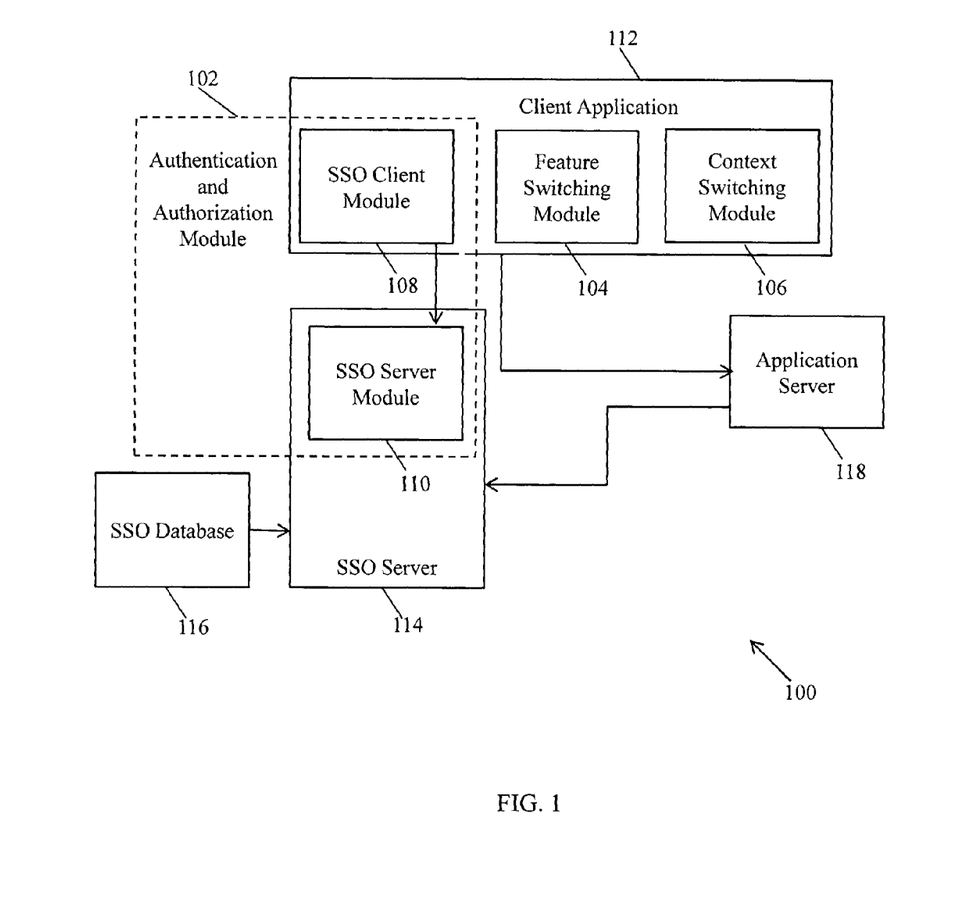
FIG. 1 is a block diagram of a system for managing access to integrated applications in a single sign-on enabled enterprise solution.

FIG. 1 is a block diagram of a system 100 for managing access to integrated applications in a single sign-on (SSO) enabled enterprise solution. The system 100 facilitates controlling access to multiple applications in an enterprise that, in a conventional set up, operates independently. In an exemplary embodiment of the present invention, the system 100 interfaces to, but not limited to, enterprise single sign-on solutions in banks, financial institutions, clearing house, insurance companies etc. The system 100 operates in a client-server architecture which comprises client application 112, a SSO server 114, a SSO database 116 and one or more application servers 118. In an exemplary embodiment of the present invention, the one or more client applications 112 may include a web-based user interface via which the user accesses one or more web-based applications integrated in SSO enabled enterprise solution. In another exemplary embodiment of the present invention, the one or more client applications 112 may also include character user interface, graphical user interface such as HTML, applet based user interface etc. The one or more applications may be hosted in the one or more application servers 118 and may include, but is not limited to, core banking application, customer relationship management (CRM) application and signature verification application. In various embodiments of the present invention, the system 100 comprises an authentication and authorization module 102, feature switching module 104 and a context switching module 106.

In an embodiment of the present invention, the authentication and authorization module 102 is a software module configured to allow users to securely access one or more applications in the SSO enabled enterprise solution in a single sign on session. The authentication and authorization module 102 further comprises a SSO client module 108 and a SSO server module 110.

In an embodiment of the present invention, the SSO client module 108 may reside in the one or more client applications 112 which accepts user credentials. In an exemplary embodiment of the present invention, the SSO client module 108 may accept user credentials from an HTML web page. In another exemplary embodiment of the present invention, the SSO client module 108 itself allows users to input user credentials. The user credentials may include, but are not limited to, user identification (id), user password and user token. The SSO client module 108 receives the user credentials and sends the user credentials to the SSO server module 110. In an embodiment of the present invention, the password may be stored in the SSO database 116 as a one-way hashed password. The one-way hashed password may be obtained by converting a password into a one-way hashed password using known hashing algorithm.

In an embodiment of the present invention, the SSO server module 110 resides in the SSO server 114. The SSO server module 110 facilitates initiating and completing a challenge-response authentication mechanism with the SSO client module 108. In an exemplary embodiment of the present invention, in a challenge-response authentication mechanism, the SSO server module 110 generates a session identification (id) which facilates to uniquely identify a user's session. The session id is a random number created by SSO server module 110 and stored in SSO database 116. In another exemplary embodiment of the present invention, the SSO server module 110 generates a challenge token (also referred as server challenge token) for the SSO client module 108. The server challenge token may include a one-way hash of random number. In an exemplary embodiment of the present invention, random number is generated using Java Secure random number generator. The one-way hash of random number is obtained by hashing a random number using any known hashing algorithm. The one-way hash of random number is, then, stored in the SSO database 116.

In response to the server challenge token, the SSO client module 108 in the client application 112 generates a response token (also referred as client response token) for the SSO server module 110. The response token may include a one-way hash of server challenge token and one-way hashed password. The one-way hash of server challenge token is obtained by hashing the server challenge token using a known hashing algorithm. The one-way hashed password may be obtained by converting a password into a hashed password using known hashing algorithm.

In another embodiment of the present invention, the SSO client module 108 generates a challenge token (also referred as client challenge token) for the SSO server module 110. The client challenge token may include a one-way hash of random number. The one-way hash of random number is obtained by hashing a random number using any known hashing algorithm.

In response to the client challenge token, the SSO server module 110 in the SSO server 114 generates a response token (also referred as server response token) for the SSO client module 108. The response token may include a one-way hash of client challenge token and hashed password. The one-way hash of client challenge token is obtained by hashing the client challenge token using a known hashing algorithm. The hashed password may be retrieved from the SSO database 116.

In an embodiment of the present invention, the client response token is verified at the SSO server module 110 and the server response token is verified at the SSO client module 108. The verification of server response token indicates authentication of user to enable access to one or more applications. In another embodiment of the present invention, after authentication is performed, the SSO server module 110 creates a session key. The session key may include, but is not limited to, user id, session id and a timestamp. The SSO server module 110 then encrypts the session key with the hashed password and sends the session key to the SSO client module 108. The SSO client module 108 decrypts the session key using the one-way hashed password which is available with it and stores the decrypted session key in a memory. Any further communication between the SSO client module 108 and the SSO server module 110 is secured using the session key.

In an embodiment of the present invention, the authentication and authorization module 102 is further configured to authorize the user to access one or more applications after authentication using the client application 112. The user makes a request for accessing an application by invoking an application registered with SSO enabled enterprise solution via a web-based user interface. The SSO client module 108 is invoked by the web-based user interface to initiate a service token request for accessing the application. In an embodiment of the present invention, SSO client module 108 sends a service token request to the SSO server module 110. The service token request includes details such as internet protocol (IP) address related to the client and application name related to the application and is encrypted using the session key. The SSO server module 110 receives, decrypts the request for service token and creates a service token which includes one or more parameters specific to the requested application. For example, the parameter may include a unique name configured for accessing the application. The SSO server module 110, then, encrypts the service token using a secret key which may be any string known to the SSO server module 110. The SSO server module 110, then, sends the encrypted service token to the client application 112.

In another embodiment of the present invention, the web-based user interface invokes a Javascript Application Programming Interface (JAPI) to send the encrypted service token to an application server 118 for receiving the application service. In an embodiment of the present invention, the application server 118 sends the encrypted service token to the SSO server module 110 for verification. In an exemplary embodiment of the present invention, the application server 118 sends the encrypted service token to the SSO server module 110 via Hypertext Transport Protocol Secure (HTTPS). The application server can also send the service token to SSO server module 110 using Transmission Control Protocol (TCP)/Internet Protocol (IP). The SSO server module 110 receives the service token and decrypts the service token using the secret key. The SSO server module 110 checks if the service token is valid and returns success or failure message to the application server 118. In an embodiment of the present invention, the SSO server module 110 validates by comparing service token details with service token verification details for a particular session. If the service token is validated, application server 118 renders the application web page on the client application 112.

Feature switching module 104 is a software module configured to facilitate the user to switch between one or more features while accessing one or more applications using web-based user interface, without requiring to change client device (not shown) settings. In an embodiment of the present invention, the feature switching module 104 may facilitate switching between different calendar types such as Gregorian, Hijri etc. during user's authenticated session. In an exemplary embodiment of the present invention, a user may switch his calendar type while accessing one or more applications by selecting a particular calendar type. The web-based user interface invokes a Javascript Application Programming Interface (JAPI) using the selected calendar type to switch between calendar types without changing client device (not shown) settings.

In another embodiment of the present invention, the feature switching module 104 may facilitate switching between different timezones during the user's authenticated session. In an exemplary embodiment of the present invention, a user may switch his timezone while accessing one or more applications by selecting a particular timezone provided as a list in the user's web-based user interface. The web-based user interface invokes a Javascript Application Programming Interface (JAPI) using the selected timezone to switch between timezones without changing the client device (not shown) settings.

In yet another embodiment of the present invention, the feature switching module 104 may facilitate switching between different entities during the user's authenticated session. In an exemplary embodiment of the present invention, a user may switch to an application corresponding to a different entity by selecting the entity provided as a list in the user's web-based user interface. The web-based user interface invokes a Javascript Application Programming Interface (JAPI) using the selected entity to switch between different entities. For example, in a multibank environment where there are legal banks or branches of same bank with corresponding timezones and currencies, a user can switch to an application in another bank within the same authenticated session without requiring to re-enter the user's credentials.

Context switching module 106 is a software module configured to facilitate one application to utilize services of another application during user's login session. In an embodiment of the present invention, when the user accesses an application during the user's login session, the user may access one or more common services provided by one or more other applications. The web-based user interface facilitates context related to the service to be transmitted between one or more applications during the user's login session. In an embodiment of the present invention, one application passes context to another application during a user's login session via a context exchange Javascript Application Programming Interface (JAPI) of the web-based user interface.

In an embodiment of the present invention, the context exchange JAPI may include a link in a first application of a primary web page. The link in the first application references a context in second application of a secondary web page. The link is enabled to access a javascript in the web-based user interface. A check may be performed to determine if the user is authenticated to access the second application. If it is determined that the user is authenticated to access the second application, then, the second application is retrieved. The web-based user interface invokes a JAPI in second application with required context data. Data relates to context that is common in second and first application. In another embodiment of the present invention, if it is determined that the user is not authenticated to access the second application, then, challenge-response based authentication is initiated as described above and with respect to FIG. 2.

In an exemplary embodiment of the present invention, the applications may include banking applications which are viewed via the client application 112 of a single sign-on enabled enterprise solution. One application may include a CRM application and the other application may include a core banking application which comprises one or more banking customer's profile information such as account identification (id) of the user. The CRM application may include a list where account id of one or more customer's accounts with the bank is displayed. Details of this account may be maintained in the core banking application. A user may access the CRM application web page and use the context exchange JAPI to retrieve users account related details available in the core banking application. The context exchange JAPI includes user's account id link. The account id link references a context in core banking application. In an example, when user enables the account id link, the link invokes a JAPI in the web-based user interface to access the core banking application service and the web-based user interface checks if user is logged into core banking application. If the user is logged in, a web page corresponding to core banking application is displayed from which details corresponding to the user's account can be fetched and displayed.

In an embodiment of the present invention, if volume of context data is less, context switching is user interface (UI) based context switching which is performed via javascript. In another embodiment of the present invention, if volume of context data is large and a huge amount of context data is passed from one application to other, then, context switching is server based context switching. Instead of passing context data through javascript, application servers 118 call SSO server module 110 to store context data and retrieve context data from SSO database 116.

Figure 2:
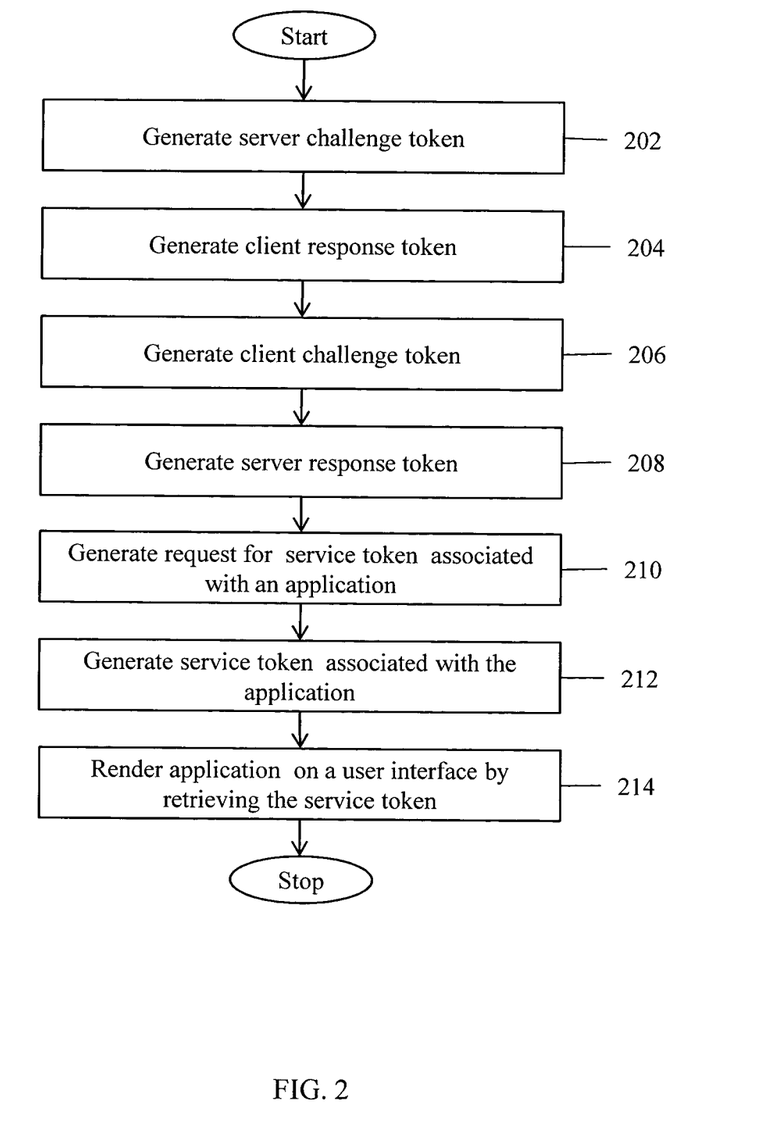
FIG. 2 illustrates a flowchart of a method for permitting access to multiple applications in a single sign-on enabled enterprise solution.

FIG. 2 illustrates a flowchart of a method for performing access management to facilitate a user to access one or more applications in a single sign-on enabled enterprise solution, in accordance with an embodiment of the present invention.

At step 202, a server challenge token is generated. In an embodiment of the present invention, session identification (id) is generated. The session id is a temporary identification associated with the user which facilitates the user to uniquely identify the user's session. The session id is a random number which is created by SSO server module and may be stored in SSO database.

In another embodiment of the present invention, the server challenge token is generated by a SSO server module. The server challenge token comprises details such as one-way hash of random number.

The user inputs user credentials in a web-based user interface. The user credentials may include user identification (id) and password. In an exemplary embodiment of the present invention, user id is validated against the user's user id which may be pre-stored in SSO database. In an embodiment of the present invention, the password is hashed using any known hashing algorithm and the one-way hashed password is stored in the SSO database. If the user identification is determined to be valid, a one-way random number, which constitutes the server challenge token is created for the user's login session and hashed using a known hashing algorithm. The hashed random number is stored in the SSO database. The SSO server module sends the server challenge token to a SSO client module.

At step 204, a client response token is generated. In an embodiment of the present invention, the client response token is a response to the server challenge token and is generated by a SSO client module. The client response token comprises details such as a one-way hash of server challenge token and hashed password. The hashed password corresponds to the user and is generated by hashing the password with any known hashing algorithm. The client response token is received and verified by the SSO server module. In an embodiment of the present invention, the verification may be performed by comparing client response token with the hash of combination of the hashed server challenge token and hashed password which is stored in SSO database.

At step 206, a client challenge token is generated. In an embodiment of the present invention, the client challenge token is generated by SSO client module. The client challenge token comprises details such as one-way hash of random number. One-way hash of random number is a hashed random number which is created using any known hashing algorithm. The client challenge token is sent by the SSO client module to the SSO server module.

At step 208, a server response token is generated. In an embodiment of the present invention, the server response token is a response to the client challenge token and is generated by SSO server module. The server response token comprises details such as a one way hash of client challenge token and hashed password. The hashed password is retrieved from SSO database. The server response token is received and verified by SSO client module. The verification may be performed by comparing server response token with the hash of the hashed client challenge token and hashed password already available in SSO client module. The user is thus authenticated to enable access to one or more applications of the SSO enabled enterprise solution.

In various embodiments of the present invention, a session key is created. In an embodiment of the present invention, after authentication is performed session key is created by the SSO server module. The session key may include, but is not limited to, a user id and session id, which is retrieved from the SSO database, and a timestamp. The session key is stored in the SSO database. Further, the session key is encrypted with the hashed password stored in SSO database and sent to the SSO client module. The session key is decrypted by SSO client module and stored in memory for secure communication between the SSO client module and SSO server module.

At step 210, a request for service token associated with an application is generated. In an embodiment of the present invention, SSO client module sends a service token request to the SSO server module to access an application. The service token request comprises details such as, but not limited to, Internal Protocol (IP) address and application name corresponding to the application which the user wishes to access. The SSO client module sends the service token request which is encrypted with the session key to the SSO server module.

At step 212, a service token associated with requested application is generated. In an embodiment of the present invention, the SSO server module receives and decrypts the service token request using the session key to retrieve details (i.e. application name) in the service token request, for identifying the application requested by the user. The SSO server module then generates a service token. The service token comprises details such as client IP address, user id, session id and a unique name for the application. In an embodiment of the present invention, the service token is encrypted with a secret key which may be any string known to the SSO server module. The SSO server module sends the encrypted service token to the SSO client module. In another embodiment of the present invention, the secret key is used for encrypting service tokens during different sessions.

At step 214, application associated with the service token is rendered on a user interface by retrieving the service token. In an exemplary embodiment of the present invention, the application server renders on the web-based user interface application specific pre login page with corresponding javascripts. The web-based user interface invokes login application javascript in the application pre login page and passes, as inputs to the application javascript, parameters such as user id, session id and encrypted service token received from the SSO client module. Application javascript passes the parameters to the application server. The application server sends the encrypted service token to the SSO server module for verification along with other details such as, but not limited to, user id and session id. The SSO server module decrypts the service token using secret key, verifies the details in service token with service token verification details for a particular session and sends success or failure message to the application server. In an embodiment of the present invention, in case of success, the application server renders the main application web page on the web-based user interface.

In various embodiments of the present invention, the system and method facilitates performing authentication and authorization management of a different user during a user's login session without creating a separate session. In an exemplary embodiment of the present invention, in a banking scenario the invention facilitates an authorizer or manager to authorize a transaction at a teller's terminal without additional overhead of creating a separate session. Further, the invention facilitates integration and seamless functioning with third party SSO enabled solutions without determining credentials of the third party SSO enabled solutions.

The present invention may be implemented in numerous ways including as a apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A method for performing access management to facilitate a user to access one or more applications in a single sign-on enabled enterprise solution, the method comprising the steps of:
  performing data transaction between a single sign-on (SSO) server and a client for authenticating the user, wherein the data transaction comprises:
    transmitting a challenge token and a response token between the SSO server and the client, wherein the challenge token and the response token comprises one-way hashed data; and
    verifying the response token at the SSO server and at the client using the one-way hashed data; and
  performing data transaction for authorizing the user to access the one or more applications, wherein the data transaction comprises:
    transmitting a request for service token between the SSO server and the client, wherein the request for service token is encrypted at the client and decrypted at the SSO server using a unique session key negotiated between the SSO server and the client;
    transmitting a service token between the SSO server and the client, wherein the service token is encrypted and decrypted at the SSO server using a secret key to verify the service token;
    transmitting the service token between the client and one or more application servers;
    transmitting the service token between the one or more application servers and the SSO server;
    decrypting the service token at the SSO server to verify the service token, wherein the service token is decrypted using the secret key;
    transmitting a verification message between the SSO server and the one or more application servers; and
    rendering the requested one or more applications on a user interface of the client based on the verification.

2. The method of claim 1, wherein the step of performing data transaction between the SSO server and the client for authenticating the user further comprises the steps of:
  receiving, at the SSO server, a second challenge token, wherein the second challenge token comprises a one-way hashed second random number;
  receiving, at the client, a second response token, wherein the second response token comprises a one-way hashed second challenge token and a one-way hashed password of the user;

verifying, at the client, the second response token based on comparing the second response token with hash of the hashed second challenge token and a one-way hashed password; and authenticating the user based on the verification.

3. The method of claim 1 further comprising:

generating, at the SSO server, a unique session identification associated with the user, wherein the unique session identification is a random number; and storing the unique session identification in a database.

4. The method of claim 3 further comprising:

creating, at the SSO server, the unique session key after authenticating the user, wherein the unique session key comprises at least one of: user identification, session identification and a timestamp;

encrypting the unique session key using the one-way hashed password;

receiving, at the client, the encrypted unique session key;

decrypting the unique session key using the one-way hashed password; and storing the decrypted unique session key in a memory associated with the client.

5. The method of claim 1, wherein the service token comprises data for accessing the one or more applications.

6. The method of claim 1, wherein the request for service token comprises at least one of:

internet protocol address associated with a client and application name associated with the requested one or more applications.

7. The method of claim 6, wherein the service token comprises at least one of: internet protocol address associated with the client, user identification, session identification and a unique name associated with the requested one or more applications.

8. One or more non-transitory computer-readable storage media having computer-executable instructions for performing a method comprising:

performing data transaction between a single sign-on (SSO) server and a client for authenticating the user, wherein the data transaction comprises:

transmitting a challenge token and a response token between the SSO server and the client, wherein the challenge token and the response token comprises one-way hashed data; and verifying the response token at the SSO server and at the client using the one-way hashed data; and performing data transaction between the SSO server and the client for authorizing the user to access one or more applications, wherein the data transaction comprises:

generating and encrypting, at the client, a request for service token, wherein the request for service token is encrypted using a unique session key, further wherein the request for service token represents request for accessing one or more applications;

receiving and decrypting, at the SSO server, the encrypted request for service token, wherein the encrypted request for service token is decrypted using the unique session key;

generating and encrypting, at the SSO server, a service token corresponding to the request for service token, wherein the service token is encrypted using a secret key;

receiving, at the client, the encrypted service token;

receiving, at one or more application servers from the client, the encrypted service token, wherein the one or more application servers correspond to the one or more applications;

receiving, at the SSO server, the encrypted service token from the one or more application servers;

decrypting, at the SSO server, the encrypted service token to verify the service token, wherein the encrypted service token is decrypted using the secret key; and rendering the requested one or more applications on a user interface of the client based on the verification.

9. The one or more non-transitory computer-readable storage media of claim 8, wherein performing data transaction between the SSO server and the client for authenticating the user further comprises:

receiving, at the SSO server, a second challenge token, wherein the second challenge token comprises a one-way hashed second random number;

receiving, at the client, a second response token, wherein the second response token comprises a one-way hashed second challenge token and a one-way hashed password of the user;

verifying, at the client, the second response token based on comparing the second response token with hash of the hashed second challenge token and a one-way hashed password; and authenticating the user based on the verification.

10. The one or more non-transitory computer-readable storage media of claim 8 further comprising:

generating, at the SSO server, a unique session identification associated with the user, wherein the unique session identification is a random number; and storing the unique session identification in a database.

11. The one or more non-transitory computer-readable storage media of claim 10 further comprising:

creating, at the SSO server, the unique session key after authenticating the user, wherein the unique session key comprises at least one of: user identification, session identification and a timestamp;

encrypting the unique session key using the one-way hashed password;

receiving, at the client, the encrypted unique session key;

decrypting the unique session key using the one-way hashed password; and storing the decrypted unique session key in a memory associated with the client.

12. The one or more non-transitory computer-readable storage media of claim 8, wherein the service token comprises data for accessing the one or more applications.

13. The one or more non-transitory computer-readable storage media of claim 8, wherein the request for service token comprises at least one of: internet protocol address associated with a client and application name associated with the requested one or more applications.

14. The one or more non-transitory computer-readable storage media of claim 13, wherein the service token comprises at least one of: internet protocol address associated with the client, user identification, session identification and a unique name associated with the requested one or more applications.

15. A computer-implemented method, comprising the steps of:

sending a challenge token to a client, the challenge token comprising a hash of a random number;

receiving a response token from the client, the response token comprising a hash of both the challenge token and a hash of a user's password;

authenticating the user by hashing the challenge token and the user's hashed password to get a resulting hash and comparing the resulting hash to the hash contained within the response token;

generating a shared key that is unique for the user's session and sending the shared key to the client;

receiving an encrypted request for a service token from the client, wherein the encrypted request for the service token is encrypted using the shared key;

decrypting the encrypted request for the service token using the shared key;

generating a service token corresponding to the request for the service token and encrypting the service token using a secret key;

sending the encrypted service token to the client;

receiving a request for service token verification from an application server, wherein the request for service token verification comprises the encrypted service token;

verifying the encrypted service token by decrypting the encrypted service token using the secret key; and sending a verification message to the application server.

16. The computer-implemented method of claim 15, further comprising:

receiving a second request for service token verification from a second application server, wherein the second request for service token verification comprises the encrypted service token;

verifying the encrypted service token by decrypting the encrypted service token using the secret key; and sending a verification message to the second application server.

17. The computer-implemented method of claim 16, wherein the client is configured to allow an application running on the first application server to access data pertaining to another application running on the second application server.

* * * * *